United States Patent [19]

Biondetti et al.

[11] Patent Number: 4,864,703
[45] Date of Patent: Sep. 12, 1989

[54] PRESS ROLL

[75] Inventors: Mario Biondetti, Schio, Italy; Wolf-Gunter Stotz, Ravensburg, Fed. Rep. of Germany

[73] Assignee: Sulzer-Escher Wyss AG, Zürich, Switzerland

[21] Appl. No.: 234,697

[22] Filed: Aug. 22, 1988

[30] Foreign Application Priority Data

Aug. 31, 1987 [CH] Switzerland .................. 03337/87

[51] Int. Cl.$^4$ ............................................ B21B 13/02
[52] U.S. Cl. .................................. 29/116.1; 29/116.2; 384/99; 384/117
[58] Field of Search ............ 29/116.1, 116.2, 117; 384/99, 117, 208, 206, 213

[56] References Cited
U.S. PATENT DOCUMENTS

| 3,562,882 | 2/1971 | Widmer | 29/116.1 |
| 4,005,916 | 2/1977 | Dillon | 384/117 |
| 4,757,583 | 7/1988 | Pav et al. | 29/116.1 |

Primary Examiner—Timothy V. Eley
Assistant Examiner—K. Jordan
Attorney, Agent, or Firm—Werner W. Kleeman

[57] ABSTRACT

In a press roll having a stationary support member and a roll shell rotatable about the stationary support member and movable in a predeterminate support or pressing direction throughout the entire width of the press roll, the provision of guide devices for the rotatable roll shell enable accomplishing an axial and radial guiding of the rotatable roll shell with minimum friction and without using roller bearings. These guide devices comprise hydrostatic support or pressure elements which can be adjusted in the predeterminate support or pressing direction. Bearing surfaces of the hydrostatic support elements and running or travel surfaces at the roll shell are spherically designed, for instance provided in mirror-image relationship to one another at both ends of the press roll, or at only one end thereof, or at the central or intermediate region of the press roll.

13 Claims, 2 Drawing Sheets

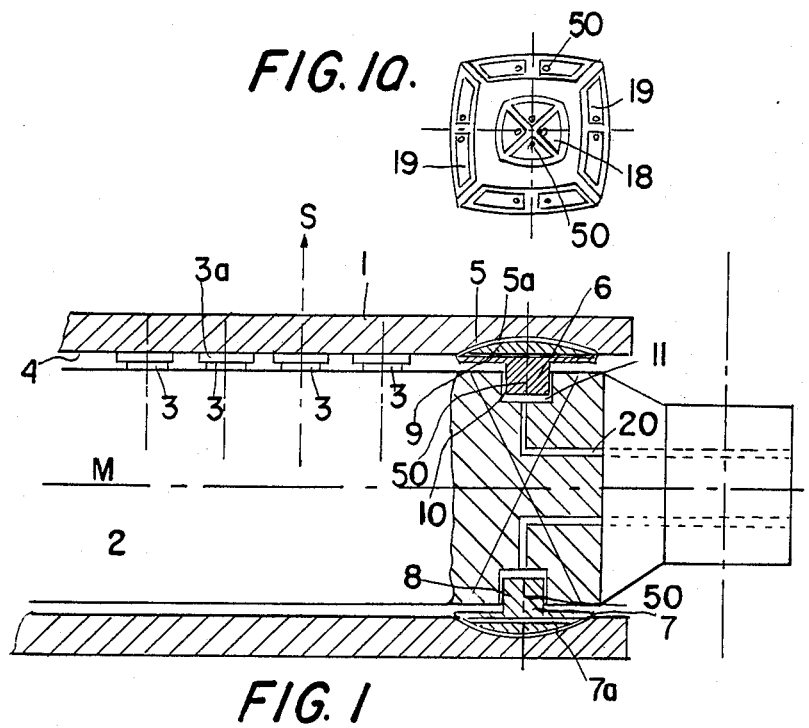
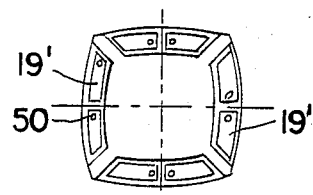
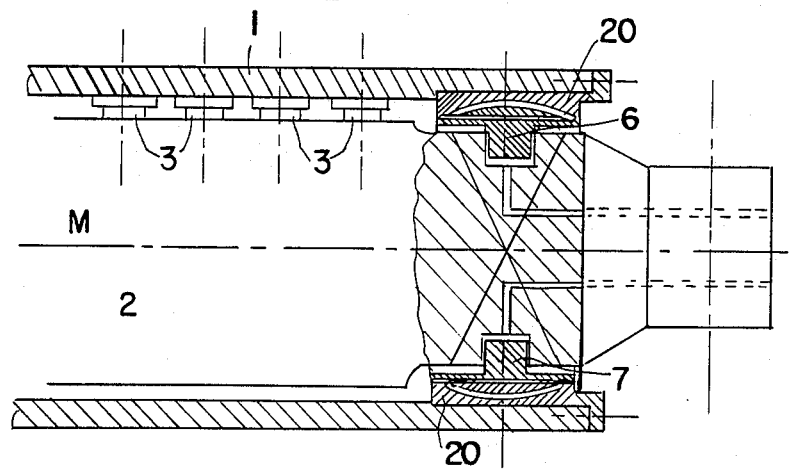

PRESS ROLL

BACKGROUND OF THE INVENTION

The present invention relates to a new and improved construction of a press or pressing roll which is of the type comprising a non-rotatable or stationary axial support member or beam and a roll shell or jacket rotatable about the non-rotatable or stationary axial support member, supported in the direction of the non-rotatable or stationary axial support member and movably mounted in a predeterminate support or pressing direction in relation to the non-rotatable or stationary support member over the entire width or axial extent of the roll shell or jacket.

Such type of press or pressing rolls or rollers, typically referred to in the art as so-called controlled deflection rolls or rolls with bending or sag compensation, as known for instance from U.S. Pat. No. 3,885,283, granted May 27, 1975 or the cognate French Patent No. 2,205,134, serve for the pressing or pressure treatment of material webs, for instance paper-, fiber-, textile-, metal- or plastic webs.

The roll shell of the prior art press roll as known from the aforementioned U.S. Pat. No. 3,885,283, is supported by hydraulic or hydrostatic or other support elements or a pressure pad against the stationary support member or beam and in the support or pressing direction is freely movable relative to the stationary support member or beam. In this way, the roll shell of such press roll can follow a counter roll and exert a uniform line force or a desired pressure profile upon the material web which passes between the press roll and the counter roll, without being influenced by movements or sag of the counter roll. In this connection, the support elements travel upon or contact the cylindrical inner surface of the roll shell or jacket and possess a corresponding cylindrical bearing surface.

In order to prevent a displacement of the roll shell in an axial direction in relation to the support member or beam and to preclude a lateral shifting or deviation of the roll shell during operation of the press roll in a roll mill or rolling device, the roll shell of such press roll is rotatably mounted at its ends at the stationary support member by means of roller bearings upon a guide device. This guide device is movably guided in the support or pressing direction in relation to the ends of the stationary support member or beam by means of a cam guide or journal guide.

Due to the provision of the bearings at the ends of the roll shell, it is possible to fix in axial direction such roll shell. However, what is disadvantageous is that there is required a complicated design of the bearings, the dimensions of which are dependent upon the diameter of the press roll. Additionally, there is also required a special oil for the lubrication of the bearings. Furthermore, the use of the roller bearings necessitates limiting the operating temperature. The existence of the bearings limits the rotational speed of the roll shell and during high rotational speeds of the press roll the presence of the bearings requires high power consumption of the drive. Additionally, the use of the noted cam structure produces disturbing friction in the presence of the transverse forces arising during operation of the press roll.

Furthermore, from U.S. Pat. No. 3,494,675, granted Feb. 10, 1970, there is known a controlled deflection roll, wherein both ends of the roll shell are provided with hydraulically lubricated semi-spherical cup bearings mounted upon the support member. The provision of such bearings, however, fixes the position of the ends of the roll shell in relation to the support member in a radial direction and does not afford the requisite radial mobility of the roll shell over its entire width in the support or pressing direction. Moreover, these semi-spherical cup bearings do not allow for any compensation of length variations which arise due to different thermal expansions of the roll shell and the support member as well as because of bending-through or sag of the support member during operation of the press roll. Therefore, when the press roll is in operation, a faultless bearing or mounting arrangement is not always ensured.

SUMMARY OF THE INVENTION

Therefore with the foregoing in mind it is a primary object of the present invention to provide a new and improved construction of a press roll which does not suffer from the aforementioned drawbacks and shortcomings of the prior art constructions.

Another and more specific object of the present invention aims at eliminating or at least appreciably mitigating the aforementioned drawbacks of heretofore known constructions of press rolls and, specifically, providing a press roll of the previously mentioned type, wherein the roll shell, while possessing free mobility in the support or pressing direction, is fixed in axial direction with relatively no friction and while avoiding the use of roller bearings.

In keeping with the immediately preceding object, it is a further object of the present invention to design a press roll such that there can be axially fixed the roll shell under the aforementioned conditions, and specifically through the utilization of a comparatively simpler construction, while employing an inexpensive working medium as the lubricant, while allowing higher permissible operating temperatures of the press roll, affording greater rotational speeds of the roll jacket, reducing the power consumption or requirements of the roll drive at high velocities and while ensuring for compensation of length variations between the roll shell and the support member or beam as well as while preventing lateral migration of the roll shell.

Now in order to implement these and still further objects of the invention, which will become more readily apparent as the description proceeds, the press roll of the present development, among other things, is manifested by the feature that there is provided at least one hydrostatic support or pressure element provided with a substantially spherical bearing surface. This hydrostatic support or pressure element is movable in the support or pressing direction and can support and axially fix the roll shell or jacket in relation to the non-rotatable or stationary support member or beam. At the roll shell or jacket there is provided a corresponding substantially spherical running or travel surface having the same curvature as the curvature of the substantially spherical bearing surface of the hydrostatic support element.

Advantageously, these hydrostatic support elements possessing the spherical bearing surfaces are designed as adjustable hydraulic or hydrostatic support or pressure elements. These adjustable hydrostatic support or pressure elements are movable in the support or pressing direction by means of a piston-and-cylinder guide or guide structure within a pressure chamber or compartment supplied with a suitable pressurized or pressure medium. Moreover, these hydrostatic support or pressure elements are provided with pressure pockets at their bearing surfaces and which flow communicate with the associated pressure chamber by one or more throttle bores.

Such hydrostatic support or pressure elements can be provided at both ends of the roll shell or jacket. However, security against axial displacements also is possible through the use of only one hydrostatic support or pressure element at one press roll end or at the central or intermediate region of the press roll, and even in the presence of larger displacements or movement of the roll shell and larger bending-through or sag of the support member there is afforded a faultless bearing or mounting arrangement.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various Figures of the drawings, there have been generally used the same reference characters to denote the same or analogous components and wherein:

FIG. 1 illustrates in fragmentary schematic view part of a press roll, constructed according to the invention, with substantially spherical configuration or form of the bearing surface of the hydrostatic support or pressure element and its coaction with an appropriately configured roll shell or jacket;

FIG. 1a illustrates in top plan view the spherical form of the bearing surface of the hydrostatic support or pressure element located at the top of the arrangement of FIG. 1;

FIG. 1b illustrates in top plan view the form of the spherical surface of the hydrostatic support or pressure element located at the bottom of the arrangement of FIG. 1;

FIG. 2 illustrates, in a showing like that of FIG. 1, a modified construction of press roll equipped with a bearing ring or ring member for the roll shell and possessing a spherical travelling or running surface, also referred to as a raceway;

DETAILED DESCRIPTION OF THE PREFERRED EMBODIMENTS

Figure 3:
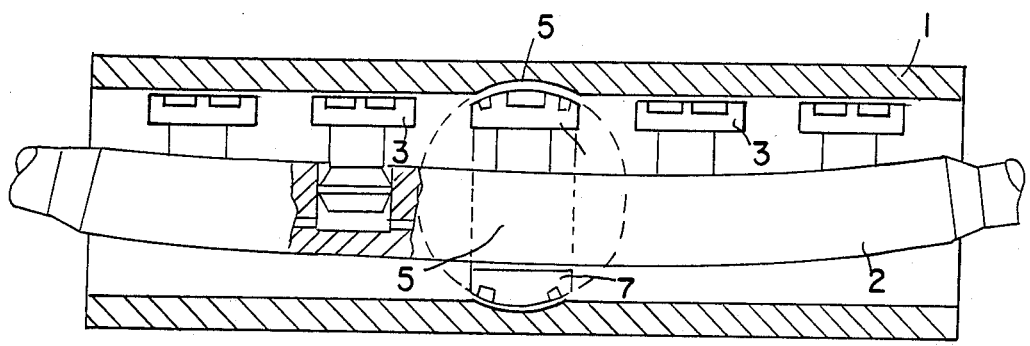
FIG. 3 illustrates in lengthwise sectional view a modified construction of press roll having a hydrostatic support or pressure element provided with a substantially spherical bearing surface and coacting with a complementary running or travel surface at the central or intermediate region of the press roll.

Describing now the drawings, it is to be understood that to simplify the showing thereof, only enough of the construction of the various embodiments or press roll have been illustrated therein as is needed to enable one skilled in the art to readily understand the underlying principles and concepts of this invention. Turning now specifically to FIG. 1 there is depicted therein a first exemplary embodiment of press or pressing roll in fragmentary axial sectional view, depicting the right-hand portion thereof, and which press roll will be seen to comprise a roll shell or jacket 1 which is rotatable about a non-rotatable or stationary support member or beam 2. This roll shell 1 is supported at the non-rotatable or stationary support member 2 in a predeterminate support or pressing direction S in the direction of a not particularly illustrated but suitable counter roll by means of a series of hydrostatic support or pressure elements 3. The hydrostatic support or pressure elements 3 are arranged adjacent one another in axial or lengthwise direction of the press roll, as is well known in this technology, for instance as disclosed in U.S. Pat. No. 3,802,044, granted Apr. 9, 1974, to which reference may be readily had, or the roll shell or jacket 1 can be supported in a different fashion, for example with other designs of support elements, support ledges or pressure pads or cushions.

In any event, by virtue of the supporting of the rotatable roll shell or jacket 1 at the non-rotatable or stationary support member 2, this rotatable roll shell or jacket 1 is movable in relation to the non-rotatable support member 2 in the support or pressing direction S and is capable of following movements or sag of the counter roll. When there is exerted a counter force then the non-rotatable or stationary support member or beam 2 bends-through, wherein, however, due to the adjustment of the hydrostatic support or pressure elements 3 the roll shell 1 is capable of following the movements or bending-through of the counter roll and there can be adjusted a uniform line force or a desired pressure profile, as is well known in this technology. The bearing surfaces 3a of the support elements 3 are formed as sections of a cylinder in correspondence with the substantially cylindrical running or travel surface 4 located at the inner or interior surface of the roll shell 1.

However, in the embodiment under discussion, the roll shell or jacket 1 is provided at its opposite ends with spherical running or travel surfaces 5 in the form of a continuous spherical ring 5a. These running or travel surfaces 5 deviate from the cylindrical form. Analogous thereto, hydrostatic support or pressure elements 6 are provided in cylindrical bores or pressure chambers 11 at the ends of the non-rotatable or stationary support member or beam 2. These hydrostatic support elements 6 have substantially spherical bearing surfaces 9 which coact with the substantially spherical running or travel surfaces 5 of the roll shell 1. To simplify the illustration of the drawings, only the right-hand end of the press roll with the described bearing structure has been depicted, and in the assumed case, then, the opposite end of the press roll would be similarly designed in mirror-image relation with such spherical bearing arrangement.

The outer or outbound situated hydrostatic support or pressure elements 6, due to their spherical mounting, form a guide device or guide means which fixes the roll shell or jacket 1 in axial or lengthwise direction and retains such roll shell in the contemplated axial position. Due to the fact that the hydrostatic support elements 6 are adjustable or positionally movable by the pressure or pressurized medium which can be introduced into the cylindrical bores or pressure chambers 11 through appropriate feed lines 20, as is well known in this art, and by virtue of the fact that also the inbound or inwardly situated support or pressure elements 3 are likewise adjustable or positionally movable, again as known in this technology, the hydrostatic support elements 6 and also the inbound hydrostatic support element 3 automatically accommodate themselves to the roll shell or jacket 1 which is freely movable in the support or pressing direction S throughout the entire width of the roll shell 1.

By virtue of the inventive design there is not required any special oil as the lubricant for the operation of the hydrostatic support elements or support devices 3 and 6, rather there can be beneficially employed comparatively inexpensive fluids, if desired even water. Owing to the cooling action of the pressure or pressurized medium there also occur lesser problems with impermissible temperatures during operation of the press roll than would be the case if there were used the conventional roller bearings. Due to the extremely low frictional resistance or friction which arises when using the aforedescribed hydrostatic bearing structures there is also possible the employment of higher rotational and operating speeds of the press roll and the power consumption of the press roll drive is relatively modest even at high operating speeds.

In order to center the roll shell or jacket 1 it is possible to provide at the side of the press roll which faces away from the counter roll additional support or pressure elements 7 which act in an opposite direction from the direction of operation of the hydrostatic support elements 6. These oppositely effective support elements, such as the hydrostatic support elements 7, and here specifically the lower hydrostatic support elements 7 in the exemplary showing of FIG. 1, are subjected to a pressure of the pressurized medium which is appropriately coordinated or matched to the pressure of the pressurized medium acting upon the other, here then the upper hydrostatic support elements 6. Depending upon the encountered conditions or desired mode of operation, such pressure which is effective at the lower hydrostatic support elements 7 can be smaller than, equal to or greater than the pressure acting upon the upper hydrostatic support elements 6. Moreover, the outbound or outwardly situated hydrostatic support elements 6 and 7 can be otherwise similarly designed as the inbound or inner situated hydrostatic support or pressure elements 3 or, however, can possess also different dimensions or a deviating construction or design or can even be powered with a different pressurized or pressure medium.

It is here remarked that when using a substantially spherical bearing surface, in principle it is sufficient to provide one such guide device or guide means with the substantially spherical support elements, such as the hydrostatic support elements 6 and 7 shown in FIG. 1, only at one end or end region of the roll shell or jacket 1, so that an expansion of this roll shell or jacket 1 during operation of the press roll, due to temperature or pressure effects, does not cause any operational disturbances. However, and as also previously explained, such hydrostatic support elements provided with spherical bearing surfaces can be provided at both ends or end regions of the press roll, and to ensure for length compensation there must be afforded, however, a sufficient inclination capability or tiltability of these hydrostatic support elements in the axial plane of the press roll which contains the lengthwise roll or shell axis M. In this regard, the hydrostatic support elements also can be positioned somewhat at an inclination, in other words, can enclose an angle with the support or pressing direction S of the press roll, and nonetheless there is afforded a faultless bearing arrangement owing to the spherical design of the bearing surface.

To prevent a tilting or tipping of the spherical bearing surface of each hydrostatic support element 6 towards the associated spherical running or travel surface 5 of the roll shell 1 and thus to prevent lateral migration or deviation of the roll shell 1 there are advantageously provided a plurality of bearing pockets 18, 19 at the bearing surface of the related hydrostatic support element 6. In particular, in the embodiment under discussion it will be observed that there are provided four central bearing or pressure pockets 18 and at a certain desired spacing therefrom eight peripheral bearing or pressure pockets 19. The central bearing pockets 18 serve for generating the pressing or support force, whereas through the provision of the peripheral bearing pockets 19 there is automatically stabilized the bearing surface and thus the roll shell and there is precluded any lateral migration of shifting of the roll shell 1. The bearing pockets 18 and 19 flow communicate with the related pressure chamber 11 by means of throttle bores 50, as shown in FIGS. 1 and 2.

In the embodiment depicted in FIG. 1, there is provided at the opposite side in relation to the hydrostatic support element 6, the counter support element 7 which is designed with a likewise substantially spherical bearing surface 7a and which can be constructed in analogous manner as the hydrostatic support or pressure element 6. However, it is also advantageous in the case of the counter support or pressure element 7 to provide only peripheral pressure or bearing pockets 19' at the bearing surface 7a thereof, as the same has been depicted in FIG. 1b, so that the forces exerted by the peripheral bearing or pressure pockets 19 (FIG. 1a) and the peripheral bearing or pressure pockets 19' (FIG. 1b) mutually cancel one another and the resultant support force is only exerted by the central bearing pockets 18 of the upper hydrostatic support element 6. A single feed pressure of the pressurized or pressure medium is sufficient for the central and peripheral bearing or pressure pockets 18, 19, 19' and which can be selected to be the same as the feed pressure of the pressure or pressurized medium powering the support elements 3. Here too, the peripheral bearing or pressure pockets 19' flow communicate with the related pressure chamber 11 by means of throttle bores 50.

Continuing, the modified construction of the press roll depicted in FIG. 2, differs from that of FIG. 1 in that here the guide device differs from the preceding exemplary embodiment only insofar as the spherical running or travel surface at the inner surface of the roll shell 1 is provided at a separate replaceable or detachable travel ring or raceway member 20 which is mounted in the roll shell 1. In this way there can be precluded weakening of the wall of the roll shell or jacket 1 at the region of the guide device, something which is particularly advantageous in the case of thin roll shells. This travel ring or raceway member 20 can be designed as a spherical ring analogous to the outer ring or raceway of a pendulum roller bearing and is simple to fabricate. There is not required any difficult to perform and expensive grinding or machining of the inner surface of the roll shell or jacket to provide an exactly centered spherical shape. Additionally, the roll shell or jacket can be easily exchanged for a new roll shell or jacket in that it is only necessary to mount the travel ring or raceway 20 in the new replacement roll shell or jacket.

In order to be able to deal with inclinations of the non-rotatable or stationary support member or beam 2 towards the roll shell or jacket 1 and at the same time to even more positively prevent a lateral deviation or migration of the roll shell 1, it is advantageous to design the upper hydrostatic support element 6 at one end of the press roll to possess as slight as possible inclinability or tiltability in all directions, in other words, to guide such only in the support or pressing direction S, however to construct the counter support element 7 such that it possesses a certain inclinability or tiltability in the axial direction, that is to say in the support or pressing plane, however not in the transverse direction, that is, in a plane perpendicular to the lengthwise axis M of the press roll, for instance, by providing an elongate or slot-shaped construction of the bore or pressure chamber 11 and the related base or foot portion 8 of the counter support element 7. The support element 6 and the counter support element 7 at the other end of the press roll then should be designed such that both such support elements are only inclinable in the axial direction, however not in the transverse direction or circumferential direction. In this way, there is achieved the result that the roll shell 1 is radially movably guided in the support or pressing direction, however is positioned in the axial direction, and there is prevented a lateral deviation or migration of the roll shell 1 in the transverse direction.

Owing to the inclinability of the hydrostatic support elements 6 and 7 there is nonetheless attained a positive and faultless mounting or support action at the spherical bearing surfaces 5 without any canting and seizing of the hydrostatic support elements even in the presence of bending-through or sag of the non-rotatable or stationary support member 2, that is to say, a local inclination of the non-rotatable or stationary support member 2 towards the roll shell 1, or during a movement or length change of the roll shell 1.

However, an increased inclinability can be forgone if the guide device, that is to say, the spherical support elements 6 and 7 are provided approximately at the central or intermediate region of the press roll where the inclination of the support member 2 towards the lengthwise axis M of the press roll or roll shell or jacket 1, as a general rule, is null, as has been depicted in FIG. 3.

Figure 4A:
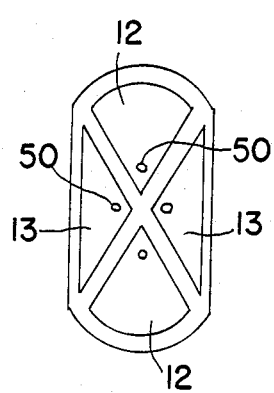
FIG. 4a illustrates one possible form of the bearing pockets of the hydrostatic support or pressure elements.
Figure 4B:
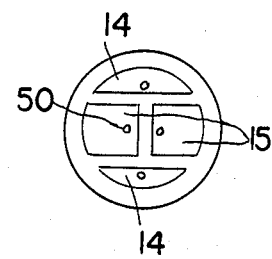
FIG. 4b illustrates a further possible construction of the bearing pockets of the hydrostatic support or pressure elements.
Figure 4C:
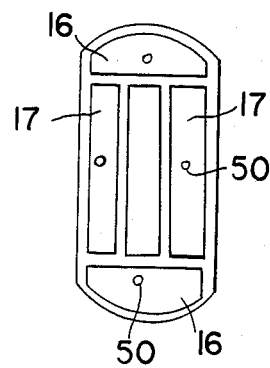
FIG. 4c illustrates a still further possible construction of the bearing pockets of the hydrostatic support or pressure elements.

The arrangement and number of the bearing or pressure pockets of the support elements possessing spherical bearing surfaces can also be selected to differ from the previously described exemplary embodiments. FIGS. 4a, 4b and 4c depict three different possibilities for arranging the bearing or pressure pockets. In FIG. 4a the bearing surface is designed as an elongate bearing surface and provided with four bearing or pressure pockets 12, 13, wherein the bearing or pressure pockets 12 orientated in the circumferential direction have a center of gravity which is further spaced or situated from the center of the bearing surface then the axially oriented bearing or pressure pockets 13, so that also here there is afforded a stabilization action in the circumferential direction. The same holds true for the construction of bearing surface depicted in FIG. 4b in the case of a circular-shaped or round support or pressure element having an asymmetrical subdivision into peripheral bearing or pressure pockets 14 and axial bearing or pressure pockets 15. Finally, in the embodiment depicted in FIG. 4c, in the depicted elongate bearing surface there are only provided marginal or edge bearing or pressure pockets and specifically peripheral bearing or pressure pockets 16 and axial bearing or pressure pockets 17 and the center of the bearing surface is free of any bearing or pressure pockets, as shown.

While there are shown and described present preferred embodiments of the invention, it is to be distinctly understood that the invention is not limited thereto, but may be otherwise variously embodied and practiced within the scope of the following claims. Accordingly,

What we claim is:

1. A press roll comprising:
   a non-rotatable axial support member;
   a roll shell rotatable about said non-rotatable axial support member;
   said roll shell having a predeterminate width;
   means for supporting said rotatable roll shell against said non-rotatable axial support member to be movable in relation to said non-rotatable axial support member throughout the predeterminate width of said rotatable roll shell in a predeterminate pressing direction;
   at least one hydrostatic support element for supporting and axially fixing the rotatable roll shell against the non-rotatable axial support member;
   said at least one hydrostatic support element being movable in the predeterminate pressing direction;
   said at least one hydrostatic support element having a substantially spherical bearing surface possessing a predeterminate curvature;
   said rotatable roll shell being provided with a substantially spherical running surface possessing substantially the same curvature as the predeterminate curvature of the substantially spherical bearing surface; and
   said substantially spherical running surface coacting with said substantially spherical bearing surface.

2. The press roll as defined in claim 1, wherein:
   said rotatable roll shell has opposite ends; and
   said hydrostatic support element possessing the substantially spherical bearing surface being provided at only one end of the rotatable roll shell.

3. The press roll as defined in claim 1, wherein:
   said rotatable roll shell has an intermediate region; and
   said hydrostatic support element provided with the substantially spherical bearing surface being provided at the intermediate region of the rotatable roll shell.

4. The press roll as defined in claim 1, wherein:
   said rotatable roll shell has opposed ends; and
   a respective one of said hydrostatic support elements provided with a substantially spherical bearing surface being provided at each of the opposed ends of the rotatable roll shell.

5. The press roll as defined in claim 1, further including:
   a further hydrostatic support element provided at a side of the roll shell opposite to a side of the roll shell where there is provided said at least one hydrostatic support element provided with said substantially spherical bearing surface and acting in the predeterminate pressing direction.

6. The press roll as defined in claim 5, wherein:

said further hydrostatic support element is provided with a substantially spherical bearing surface.

7. The press roll as defined in claim 5, wherein:
said press roll has a lengthwise roll axis; and
means imparting to the further hydrostatic support element at the side of the press roll opposite to the predeterminate pressing direction an increased inclinability in an axial plane of the press roll containing the lengthwise axis than in a plane substantially perpendicular to the lengthwise axis of the press roll.

8. The press roll as defined in claim 1, wherein:
said at least one hydrostatic support element comprises a hydraulically positionable support element;
means defining a piston-and-cylinder guide structure for adjustably positioning the at least one hydrostatic support element;
said piston-and-cylinder guide structure comprising a pressure chamber;
means for supplying a pressurized fluid medium to the pressure chamber for moving the at least one hydrostatic support element in the predeterminate pressing direction;
said at least one hydrostatic support element being provided at said substantially spherical bearing surface thereof with pressure pockets; and
throttle bore means for flow communicating said pressure pockets with said pressure chamber.

9. The press roll as defined in claim 1, wherein:
said at least one hydrostatic support element is provided at said substantially spherical bearing surface thereof with a plurality of pressure pockets;
said plurality of pressure pockets being oriented in different directions; and
means for supplying the same pressure medium to said plurality of pressure pockets.

10. The press roll as defined in claim 9, wherein:
said plurality of pressure pockets comprise central pressure pockets provided at the substantially spherical bearing surface of said at least one hydrostatic support element and peripheral bearing pockets spaced from said central bearing pockets.

11. The press roll as defined in claim 1, further including:
a further hydrostatic support element provided at a side of the roll shell opposite to a side of the roll shell where there is provided said at least one hydrostatic support element provided with said substantially spherical bearing surface and acting in the predeterminate pressing direction;
said further hydrostatic support element being provided with a substantially spherical bearing surface;
said at least one hydrostatic support element being provided with a plurality of bearing pockets comprising central bearing pockets and peripheral bearing pockets; and
said further hydrostatic support element being provided with only peripheral bearing pockets.

12. The press roll as defined in claim 1, wherein:
said roll shell is provided with a detachable member mountable at said roll shell; and
said detachable member is provided with said substantially spherical running surface.

13. A press roll comprising:
a stationary support member;
a roll shell rotatable about said stationary support member;
means for supporting said rotatable shell at said stationary support member to be movable in relation to said stationary support member in a predeterminate direction;
at least one hydrostatic support element for supporting and axially fixing the rotatable roll at the stationary support member;
said at least one hydrostatic support element being movable in said predeterminate direction;
said at least one hydrostatic support element having a substantially spherical bearing surface possessing a curvature;
said rotatable roll shell being provided with a substantially spherical running surface possessing essentially the same curvature as the curvature of the substantially spherical bearing surface; and
said spherical running surface coacting with said spherical bearing surface.

* * * * *

UNITED STATES PATENT AND TRADEMARK OFFICE
CERTIFICATE OF CORRECTION

PATENT NO. : 4,864,703

DATED : September 12, 1989

INVENTOR(S) : MARIO BIONDETTI et al

It is certified that error appears in the above-identified patent and that said Letters Patent is hereby corrected as shown below:

Column 10, line 27, after "rotatable" please insert --roll--

Column 10, line 32, after "roll" please insert --shell--

Signed and Sealed this

Twenty-third Day of October, 1990

*Attest:*

HARRY F. MANBECK, JR.

*Attesting Officer*     *Commissioner of Patents and Trademarks*